United States Patent
Yasuda et al.

(10) Patent No.: US 9,324,502 B2
(45) Date of Patent: Apr. 26, 2016

(54) LITHIUM ION CAPACITOR

(75) Inventors: Naoshi Yasuda, Komatsu (JP); Takashi Chiba, Nirasaki (JP); Kazuyoshi Okada, Hokuto (JP); Kuniyasu Hiraiwa, Hokuto (JP)

(73) Assignee: JM Energy Corporation, Hokuto (JP)

( * ) Notice: Subject to any disclaimer, the term of this patent is extended or adjusted under 35 U.S.C. 154(b) by 190 days.

(21) Appl. No.: 13/880,762

(22) PCT Filed: Sep. 9, 2011

(86) PCT No.: PCT/JP2011/070559
§ 371 (c)(1),
(2), (4) Date: Apr. 22, 2013

(87) PCT Pub. No.: WO2012/063545
PCT Pub. Date: May 18, 2012

(65) Prior Publication Data
US 2013/0208404 A1 Aug. 15, 2013

(30) Foreign Application Priority Data
Nov. 10, 2010 (JP) .................. 2010-251685

(51) Int. Cl.
*H01G 9/048* (2006.01)
*H01G 11/06* (2013.01)
(Continued)

(52) U.S. Cl.
CPC ............ *H01G 9/048* (2013.01); *H01G 9/0425* (2013.01); *H01G 9/145* (2013.01); *H01G 11/06* (2013.01); *H01G 11/28* (2013.01); *H01G 11/38* (2013.01); *H01G 11/44* (2013.01); *Y02E 60/13* (2013.01)

(58) Field of Classification Search
CPC ..... H01G 9/0425; H01G 9/145; H01G 9/048; H01G 11/28; H01G 11/38; H01G 11/06; H01G 11/44; H01G 9/042; H01G 11/26; Y02E 60/13

USPC .................................. 361/516, 502
See application file for complete search history.

(56) References Cited

U.S. PATENT DOCUMENTS

2009/0075172 A1* 3/2009 Ando ............. H01G 11/50
429/209
2009/0097189 A1* 4/2009 Tasaki et al. ............ 361/512
(Continued)

FOREIGN PATENT DOCUMENTS

CN 101310350 11/2008
JP 2010 62335 3/2010
(Continued)

OTHER PUBLICATIONS

International Search Report Issued Dec. 6, 2011 in PCT/JP11/70559 Filed Sep. 9, 2011.
(Continued)

*Primary Examiner* — Jenny L Wagner
*Assistant Examiner* — Michael P McFadden
(74) *Attorney, Agent, or Firm* — Oblon, McClelland, Maier & Neustadt, L.L.P.

(57) ABSTRACT

Provided is a lithium ion capacitor that can maintain a high capacity retention rate and suppress an increase in internal resistance even after high-load charging-discharging is repeated many times and that has long service life because the occurrence of a short circuit due to precipitation of lithium on the negative electrode is prevented.
The lithium ion capacitor comprises a positive electrode, a negative electrode, and an electrolyte solution, the negative electrode including a current collector and electrode layers that contain a negative electrode active material and are formed on front and back surfaces of the current collector, wherein, in the negative electrode, ratios of deviations of respective thicknesses of the electrode layers formed on the front and back surfaces of the current collector from an average of the thicknesses of the electrode layers to the average is −10 to 10%.

11 Claims, 1 Drawing Sheet

(51) Int. Cl.
*H01G 11/28* (2013.01)
*H01G 11/38* (2013.01)
*H01G 9/042* (2006.01)
*H01G 9/145* (2006.01)
*H01G 11/44* (2013.01)

(56) References Cited

U.S. PATENT DOCUMENTS

| | | | | |
|---|---|---|---|---|
| 2009/0135549 A1* | 5/2009 | Ando et al. | | 361/503 |
| 2009/0148759 A1* | 6/2009 | Mitsuda et al. | | 429/142 |
| 2010/0027193 A1* | 2/2010 | Marumo et al. | | 361/505 |
| 2010/0027195 A1* | 2/2010 | Taguchi | | H01G 11/06 361/527 |
| 2010/0142121 A1* | 6/2010 | Fujii et al. | | 361/502 |

FOREIGN PATENT DOCUMENTS

| | | |
|---|---|---|
| JP | 2010 157541 | 7/2010 |
| JP | 2010 232404 | 10/2010 |
| WO | 2005 117043 | 12/2005 |

OTHER PUBLICATIONS

Chinese Office Action issued May 21, 2015, in corresponding application No. 201180054165.1 with English Abstract.

* cited by examiner

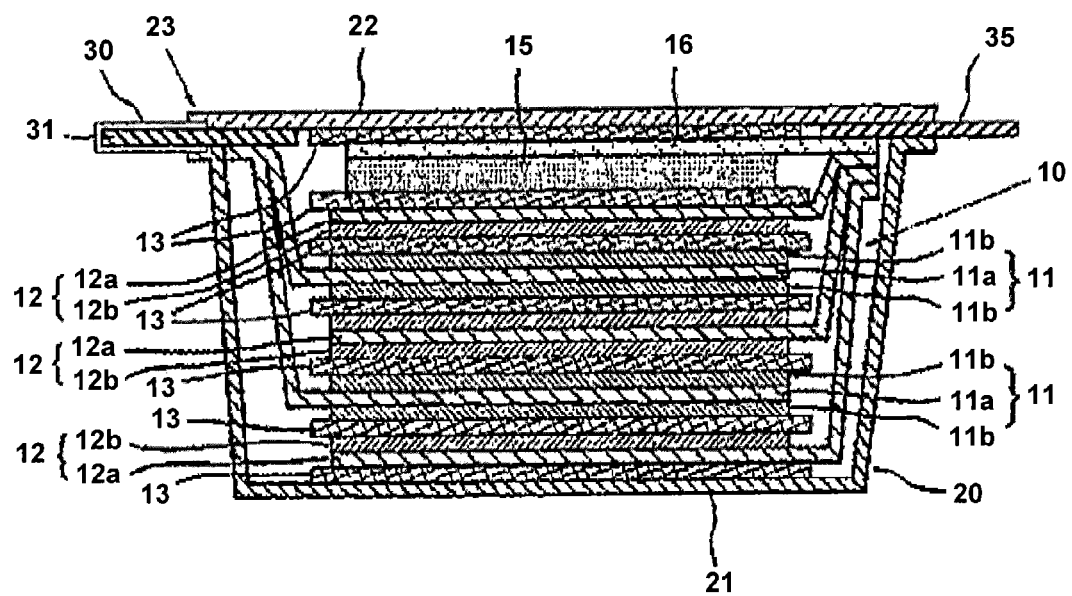

LITHIUM ION CAPACITOR

CROSS-REFERENCE TO RELATED APPLICATIONS

This application is a National Stage of PCT/JP2011/070559 filed on Sep. 9, 2011. This application is based upon and claims the benefit of priority to Japanese Application No. 2010-251685 filed on Nov. 10, 2010.

TECHNICAL FIELD

The present invention relates to a lithium ion capacitor having a negative electrode including a current collector and electrode layers formed on the front and back surfaces thereof.

BACKGROUND ART

In one recently proposed lithium ion capacitor, lithium ions are occluded in and supported by a negative electrode capable of occluding and deoccluding lithium ions in advance using a chemical or electrochemical method to reduce the potential of the negative electrode, and high energy density is thereby achieved (see Patent Literature 1).

In this lithium ion capacitor, electrode layers containing active materials and formed on the front and back surfaces of current collectors are used as the positive and negative electrodes.

The conventional lithium ion capacitor, however, has a problem in that a reduction in capacity retention ratio and an increase in internal resistance occur after high-load charging-discharging is repeated many times. Another problem is that lithium precipitates on the negative electrode, causing a short circuit. Since the conventional lithium ion capacitor has such problems, when high-load charging-discharging is repeated many times, it is difficult to achieve long service life.

CITATION LIST

Patent Literature

Patent Literature 1: Japanese Patent Application Laid-Open No. 2008-66342

SUMMARY OF INVENTION

Technical Problem

The present invention has been made on the basis of the foregoing circumstances and has as its object the provision of a lithium ion capacitor that can maintain a high capacity retention rate and suppress an increase in internal resistance even after high-load charging-discharging is repeated many times and that has long service life because the occurrence of a short circuit due to precipitation of lithium on the negative electrode is prevented.

Solution to Problem

To achieve the foregoing object, the present inventors have conducted extensive studies and found that the above problems arise because of the difference between the thickness of the electrode layer formed on the front surface of the current collector for the negative electrode and the thickness of the electrode layer formed on the back surface of the current collector. The inventors have arrived at the present invention on the basis of this finding.

Accordingly, the lithium ion capacitor of the present invention comprises a positive electrode, a negative electrode, and an electrolyte solution, the negative electrode including a current collector and electrode layers that contain a negative electrode active material and are formed on front and back surfaces of the current collector, wherein, in the negative electrode, ratios of deviations of respective thicknesses of the electrode layers formed on the front and back surfaces of the current collector from an average of the thicknesses of the electrode layers to the average is −10 to 10%.

In the lithium ion capacitor of the present invention, a thickness of the current collector in the negative electrode may preferably be 5 to 40 μm, and a sum of the thicknesses of the electrode layers in the negative electrode may preferably be 20 to 200 μm.

The positive electrode may preferably include a current collector and electrode layers that contain a positive electrode active material and are formed on front and back surfaces of the current collector, a capacitance per unit mass of the negative electrode active material in the negative electrode may preferably be at least three times a capacitance per unit mass of the positive electrode active material in the positive electrode, and a mass of the positive electrode active material in the positive electrode may preferably be larger than a mass of the negative electrode active material in the negative electrode.

The negative electrode active material contained in the electrode layer formed on the front surface of the current collector in the negative electrode may preferably be identical to the negative electrode active material contained in the electrode layer formed on the back surface of the current collector.

The negative electrode active material in the negative electrode may preferably be graphite or non-graphitizable carbon.

Advantageous Effects of Invention

In the lithium ion capacitor of the present invention, the ratios of the deviations of the respective thicknesses of the electrode layers formed on the front and back surfaces of the current collector in the negative electrode from the average of the thicknesses of the electrode layers to the average fall within a specific range. Therefore, even after high-load charging-discharging is repeated many times, a high capacity retention rate is obtained, and an increase in internal resistance is suppressed. In addition, the occurrence of a short circuit due to precipitation of lithium on the negative electrode is prevented, and therefore long service life is achieved.

BRIEF DESCRIPTION OF THE DRAWING

The FIGURE illustrates a sectional view of one embodiment of a lithium ion capacitor.

DESCRIPTION OF EMBODIMENTS

Embodiments of the lithium ion capacitor of the present invention will next be described.

The lithium ion capacitor of the present invention includes a positive electrode, a negative electrode, and an electrolyte solution that are housed in an outer container.

Herein the "positive electrode" is an electrode from which an electric current flows during discharging, and the "negative electrode" is an electrode into which an electric current flows during discharging.

<Positive Electrode and Negative Electrode>

In the lithium ion capacitor of the present invention, the positive electrode used is preferably an electrode including, for example, a sheet-shaped metal current collector and electrode layers containing a positive electrode active material and formed on the front and back surfaces of the current collector.

The negative electrode used is an electrode including, for example, a sheet-shaped metal current collector and electrode layers containing a negative electrode active material and formed on the front and back surfaces of the current collector.

<<Current Collectors>>

Aluminum, stainless steel, etc. may be used as the metal making up the current collector in the positive electrode.

Stainless steel, copper, nickel, etc. may be used as the metal making up the current collector in the negative electrode.

The thicknesses of the current collectors in the positive and negative electrodes are preferably 5 to 40 μm. When the thicknesses of the current collectors are within the above range, the positive and negative electrodes obtained have high strength, and a slurry can be easily applied when the electrode layers are formed. This can improve coating accuracy, and volumetric energy density and gravimetric energy density can thereby be improved.

When a high-capacity lithium ion capacitor of, for example, the wound- or stacked type is formed, current collectors formed of a porous material having pores passing through its front and back surfaces are preferably used, and specific examples of such a porous material include an expanded metal, a punched metal, a metal net, a foam, and a porous foil having through pores formed by etching. No particular limitation is imposed on the shape, number, etc. of the through pores in the porous material making up the current collectors, so long as the through pores allow lithium ions in the electrolyte solution described later to move between the front and back sides of the positive or negative electrode without being blocked by its current collector.

<<Electrode Layers>>

A material capable of being doped and dedoped with one or both of lithium ions and anions such as tetrafluoroborate can be used as the positive electrode active material contained in the electrode layers in the positive electrode.

A material capable of being doped and dedoped with lithium ions is used as the negative electrode active material contained in the electrode layers in the negative electrode.

In the present invention, the phrase "being doped with" means "occluding," "supporting," or "being impregnated with." More specifically, this refers to a phenomenon in which lithium ions or anions are introduced into the positive electrode active material or a phenomenon in which lithium ions are introduced into the negative electrode active material.

The phrase "being dedoped with" means "desorbing." More specifically, this refers to a phenomenon in which lithium ions or anions are desorbed from the positive electrode active material or a phenomenon in which lithium ions are desorbed from the negative electrode active material.

Preferably, activated carbon is used as the positive electrode active material. The activated carbon used as the positive electrode active material has an average particle diameter D50 (50% volume cumulative diameter) of preferably 2 to 8 μm, more preferably 3 to 8 μm. If activated carbon having an average particle diameter D50 of less than 2 μm is used, the discharge drop of the obtained lithium ion capacitor tends to be large. This may be because the filling density of the positive electrode active material in the electrode layers becomes too large. Therefore, the gaps between the activated carbon particles become small, and the electrolyte solution tends to be depleted. If activated carbon having an average particle diameter D50 of larger than 8 μm is used, the formation itself of the electrode layers tends to be difficult. Even when the electrode layers can be formed, a high energy density is unlikely to be obtained because the filling density of the positive electrode active material in the electrode layers is low. The value of the average particle diameter D50 of the activated carbon can be measured by, for example, a laser diffraction micro-track method.

Preferably, a phenolic resin, petroleum pitch, petroleum coke, coconut shell, coal-based coke, etc. are used as the raw material of the activated carbon, and a phenolic resin or coal-based coke is particularly preferably used because activated carbon having a high specific surface area is obtained. Such a raw material is subjected to carbonization by firing, then subjected to steam-activation treatment or alkali-activation treatment, and pulverized to obtain activated carbon.

Preferably, graphite or non-graphitizable carbon is used as the negative electrode active material. The negative electrode active material has an average particle diameter D50 of preferably 0.5 to 30 μm, more preferably 0.5 to 15 μm, particularly preferably 0.5 to 6 μm. The specific surface area of the particles of the negative electrode active material is preferably 0.1 to 2,000 $m^2/g$, more preferably 0.1 to 1,000 $m^2/g$, particularly preferably 0.1 to 600 $m^2/g$.

The electrode layers in the positive and negative electrodes are formed on the current collectors using materials containing the above-described positive electrode active material or negative electrode active material (hereinafter these are collectively referred to as an "active material"). No particular limitation is imposed on a method of forming the electrodes, and any publicly known method can be used. More specifically, electrode layers can be formed by coating the front and back surfaces of a current collector with a slurry prepared by dispersing an active material powder, a binder, an optional conductive powder, and an optional thickener (e.g., carboxymethyl cellulose) in an aqueous medium or an organic solvent and then drying the slurry or formed by forming the slurry into a sheet shape and applying the formed sheets to the front and back surfaces of a current collector.

The binder used to prepare the slurry is, for example, any of rubber-based binders such as SBR, fluorine-based resins such as polyethylene tetrafluoride and polyvinylidene fluoride, olefin-based resins such as polypropylene and polyethylene, and acrylic-based resins.

The slurry is particularly preferably a water-based slurry prepared using an emulsion of SBR or an acrylic-based resin and an aqueous solution of a thickener such as carboxymethyl cellulose.

The amount of the binder used varies depending on the type of the active material, the shape of the electrodes, etc. and is, for example, 2 to 40% by mass based on the amount of the active material.

The conductive powder used optionally is, for example, acetylene black, graphite, or a metal powder. The amount of the conductive material used varies depending on the electric conductivity of the active material, the shape of the electrodes, etc. and is, for example, 2 to 40% by mass based on the amount of the active material.

In the lithium ion capacitor of the present invention, the ratios of the deviations of the thicknesses of the electrode layer formed on the front surface of the current collector in the negative electrode (it may be hereinafter referred to as "one electrode layer") and the electrode layer formed on the back surface of the current collector (it may be hereinafter referred to as "the other electrode layer") from the average of the thicknesses of the one and the other electrode layers to the average are −10 to 10%, preferably −5 to 5%, more preferably −3 to 3%.

In the present invention, the thicknesses of the one and the other electrode layers in the negative electrode are determined as follows.

First, the volume V of the negative electrode, the volume $V_0$ of the current collector, the surface area $S_1$ of the one electrode layer, and the surface area $S_2$ of the other electrode layer are measured, and then the total thickness T of the one and the other electrode layers in the negative electrode is computed from the measured values using a following formula (1).

$$T=(V-V_0)/[(S_1+S_2)/2] \qquad \text{Formula (1):}$$

When a porous material having a large number of through pores such as an expanded metal is used for the current collector, the apparent volume of the porous material including the volumes of the through pores is used as the volume $V_0$ of the current collector.

The volume of the negative electrode etc. can be determined by measuring its thickness using a thickness gage with a resolution of 0.1 μm and then measuring the plane dimensions using an ordinary vernier caliper.

Next, the volume $V_1$ of the negative electrode after the other electrode layer is removed is measured, and the thickness $T_1$ of the one electrode layer in the negative electrode is computed from the measured values using a following formula (2).

$$T_1=(V_1-V_0)/S_1 \qquad \text{Formula (2):}$$

The other electrode layer in the negative electrode can be removed from the back surface of the current collector by, for example, scraping the other electrode layer with a cloth such as a water-wet cloth.

Next, the thickness $T_2$ of the other electrode layer in the negative electrode is computed from the obtained value of the thickness T1 of the one electrode layer using a following formula (3).

$$T_2=T-T_1 \qquad \text{Formula (3):}$$

Then the average thickness value $T_0$ $(=(T_1+T_2)/2)$, the deviation $D_1$ of the thickness of the one electrode layer $(=T_1-T_0)$, and the deviation $D_2$ of the thickness of the other electrode layer $(=T_2-T_0)$ are determined from the value of the thickness $T_1$ of the one electrode layer and the value of the thickness $T_2$ of the other electrode layer. The ratio of the deviation $D_1$ of the thickness of the one electrode layer from the average thickness $T_0$ of the one and the other electrode layers to the average thickness $T_0$ $[(D_1/T_0)\times100]$ and the ratio of the deviation $D_2$ of the thickness of the other electrode layer from the average thickness $T_0$ of the one and the other electrode layers to the average thickness $T_0$ $[(D_2/T_0)\times100]$ are determined from the above-computed values.

The total thickness T of the one and the other electrode layers in the negative electrode is preferably 20 to 200 μm, more preferably 20 to 100 μm. If the total thickness T of the electrode layers is less than 20 μm, the thicknesses of the electrode layers are difficult to control in terms of production technique. If the total thickness T of the electrode layers is larger than 200 μm, there is the fear that the sliding down of the electrode layers and cracks may occur, and therefore it is not easy to form electrode layers with a uniform thickness. In other words, when the total thickness T of the one and the other electrode layers formed is within the above range, the difference in thickness between the one and the other electrode layers in forming the one and the other electrode layers can be reduced. Therefore, electrode layers in which the ratios of the deviations from the average thickness to the average thickness are within the above range can be formed in a reliable manner.

The thicknesses of the electrode layers in the positive electrode are preferably 30 to 250 μm, more preferably 30 to 150 μm.

In the positive electrode, conductive layers containing, for example, a conductive carbonaceous material may be formed between the current collector and the electrode layers.

Preferably, in the lithium ion capacitor of the present invention, the capacitance per unit mass of the negative electrode active material in the negative electrode is at least three times the capacitance per unit mass of the positive electrode active material in the positive electrode, and the mass of the positive electrode active material in the positive electrode is larger than the mass of the negative electrode active material in the negative electrode. This allows a high-voltage and high-capacity lithium ion capacitor to be obtained. More specifically, when the capacitance per unit mass of the negative electrode active material in the negative electrode is at least three times the capacitance per unit mass of the positive electrode active material in the positive electrode, the mass of the negative electrode active material can be reduced without changing the amount of potential change in the negative electrode, and this allows a relative increase in the charging amount of the positive electrode active material, resulting in an increase in the overall capacitance and capacity of the lithium ion capacitor. The mass of the positive electrode active material is preferably larger than the mass of the negative electrode active material and is more preferably 1.1 to 10 times the mass of the negative electrode active material. If the mass of the positive electrode active material is less than 1.1 times the mass of the negative electrode active material, the difference in capacity between the positive and negative electrodes becomes small. If the mass of positive electrode active material is larger than 10 times the mass of the negative electrode active material, the overall capacitance and capacity of the lithium ion capacitor may become small. In addition, the difference between the thickness of the electrode layers in the positive electrode and the thickness of the electrode layers in the negative electrode becomes excessively large, and this is not preferred in terms of the configuration of the capacitor.

In the regions of each current collector in which the electrode layers are formed, the mass per unit area of the active material contained in the electrode layers on the front and back surfaces of the current collector (basis weight) is preferably 2.0 to 5.0 mg/cm$^2$, particularly preferably 2.5 to 4.0 mg/cm$^2$ from the viewpoints of durability and energy density. If the mass of the active material is less than 2.0 mg/cm$^2$, a high energy density can be obtained, but the durability may deteriorate. If the mass of the active material is larger than 5.0 mg/cm$^2$, the energy density may become low.

Preferably, the mass per unit area of the positive electrode active material contained in the electrode layers on the front and back surfaces of the current collector in the positive electrode is larger than the mass per unit area of the negative electrode active material contained in the electrode layers on the front and back surfaces of the current collector in the negative electrode. This allows an improvement in the energy density.

In the negative electrode, the active material contained in the one electrode layer may be the same as or different from the active material contained in the other electrode layer.

Preferably, these active materials are the same. This allows the slurry to be easily applied to the front and back surfaces of the current collector during the formation of the electrode layers. In addition, although the doping amount of lithium ions is difficult to control in the lithium ion capacitor, a structure that does not allow lithium to easily precipitate on the negative electrode can be obtained.

<<Electrode Structure>>

In the lithium ion capacitor of the present invention, no particular limitation is imposed on the specific structures of the positive and negative electrodes. Preferred examples of the electrode structure include: a wound-type structure including an electrode unit produced by winding a stack of band-shaped positive and negative electrodes with separators therebetween; and a stacked-type structure including an electrode unit produced by alternately stacking at least three plate-shaped positive electrodes and at least three plate-shaped negative electrodes with separators therebetween. Any of the electrode structures described in, for example, WO00/07255, WO03/003395, Japanese Patent Application Laid-Open No. 2004-266091, etc. may be used as the above electrode structure.

<Electrolyte Solution>

In the lithium ion capacitor of the present invention, the term "electrolyte solution" is used to include not only an electrolyte solution prepared by dissolving an electrolyte in a solvent but also materials having an ion conductive function such as a solid electrolyte and a gel electrolyte prepared by swelling a conductive material in a polymer.

When the electrolyte solution used is an electrolyte solution prepared by dissolving an electrolyte in a solvent, an aprotic organic solvent electrolyte solution of a lithium salt is preferred.

<<Organic Solvent>>

Specific examples of the aprotic organic solvent used to prepare the electrolyte solution include ethylene carbonate, propylene carbonate, dimethyl carbonate, diethyl carbonate, methyl ethyl carbonate, γ-butyrolactone, acetonitrile, dimethoxyethane, tetrahydrofuran, dioxolane, methylene chloride, and sulfolane. These organic solvents may be used either singly or in any combination thereof. An organic solvent sufficiently dehydrated is preferably used.

<<Electrolyte>>

Various lithium salts can be used as the lithium salt making up the electrolyte so long as they can generate lithium ions in the above organic solvent. Specific examples of such lithium salts include $LiClO_4$, $LiAsF_6$, $LiBF_4$, $LiPF_6$, $LiN(C_2F_5SO_2)_2$, and $LiN(CF_3SO_2)_2$. A lithium salt sufficiently dehydrated is preferably used.

The concentration of the electrolyte in the electrolyte solution is preferably not lower than 0.1 mol/L, more preferably 0.5 to 1.5 mol/L, from the viewpoint of reducing the internal resistance due to the electrolyte solution.

<Doping with Lithium Ions>

In the lithium ion capacitor of the present invention, the negative electrode is doped with lithium ions through electrochemical contact between the negative electrode and a lithium ion supply source.

The lithium ion supply source used may be a material, such as metallic lithium or a lithium-aluminum alloy, that contains at least a lithium element and can supply lithium ions.

In the lithium ion capacitor of the present invention, no particular limitation is imposed on means for doping the negative electrode with lithium ions in advance. For example, the negative electrode can be doped with lithium ions by disposing the lithium ion supply source in the capacitor. The mass of lithium in the lithium ion supply source may be such an amount that a prescribed capacity is obtained by doping the negative electrode with lithium ions. The negative electrode and the lithium ion supply source may be in physical contact with each other (short-circuited) or may be in electrochemical contact with each other through the electrolyte solution. The lithium ion supply source may be formed on a current collector formed from a conductive porous body. A conductive porous body such as a metal porous body, e.g., a copper mesh or a copper net, that does not react with the lithium ion supply source can be used as the current collector.

In a wound- or stacked-type high-capacity lithium ion capacitor, current collectors for receiving-supplying electricity are provided for the respective positive and negative electrodes. Preferably, in such a configuration, the lithium ion supply source is disposed at a position facing the current collector for the negative electrode and is brought into electrochemical contact with the negative electrode to supply lithium ions.

When, for example, a wound-type lithium ion capacitor is produced, the lithium ion supply source is disposed on any one of or both of the outer circumferential surface and inner circumferential surface of an electrode unit produced by winding positive and negative electrodes, whereby the negative electrode can be doped with lithium ions from the lithium ion supply source.

When a stacked-type lithium ion capacitor is produced, the lithium ion supply source is disposed on the outermost layer of an electrode unit produced by stacking positive and negative electrodes, whereby the negative electrode can be doped with lithium ions from the lithium ion supply source.

The FIGURE illustrates a sectional view of one embodiment of a lithium ion capacitor of the present disclosure. The capacitor includes a positive electrode terminal 30 with a terminal substrate 31 and a negative electrode terminal 35. A bonding portion 23 and an outer film 22 makeup an upper portion of the capacitor, and an outer container 20 and an outer film 21 makeup a lower portion of the capacitor. A plurality of separators 13 are sandwiched between a lithium electrode current collector 16, a lithium ion supply source 15, a plurality of negative electrode current collectors 12a and electrode layers 12b that makeup a plurality of negative electrode sheets 12, and a plurality of electrode layers 11b surrounding positive electrode current collectors 11a makeup a plurality of positive electrode sheets 11. The plurality of negative electrode current collectors 12a converge into an electrode unit 10.

In the lithium ion capacitor of the present invention, the negative electrode is doped with lithium ions, and the potential of the positive electrode after the positive electrode is short-circuited with the negative electrode is preferably not larger than 2.0 V (versus $Li/Li^+$). When the negative electrode is not doped with lithium ions, the potentials of the positive and negative electrodes are 3 V (versus $Li/Li^+$), and therefore the potential of the positive electrode after the positive electrode is short-circuited with the negative electrode is 3 V.

In the present invention, the phrase "the potential of the positive electrode after the positive electrode is short-circuited with the negative electrode is preferably not larger than 2.0 V (versus $Li/Li^+$)" means that the potential of the positive electrode determined by any of following two methods (A) and (B) is not larger than 2.0 V.

(A) The negative electrode is doped with lithium ions, and then the positive and negative electrodes are connected through a lead wire. They are left to stand for at least 12 hours, and then the short circuit is released. Then the potential of the positive electrode is measured within 0.5 to 1.5 hours. (B) Constant current discharging is performed until 0 V using a charging-discharging test apparatus over at least 12 hours. Then the positive and negative electrodes are connected through a lead wire and left to stand for at least 12 hours, and then the short circuit is released. Then the potential of the positive electrode is measured within 0.5 to 1.5 hours.

In the present invention, "the potential of the positive electrode of not larger than 2.0 V (versus $Li/Li^+$) after the positive electrode is short-circuited with the negative electrode" is not limited to the potential immediately after the doping with lithium ions and is also used to include the case in which the potential of the positive electrode is not larger than 2.0 V (versus $Li/Li^+$) after the positive and negative electrodes are short-circuited after charging, after discharging, or after charging and discharging are repeated.

In the present invention, doping with lithium ions may be performed on the negative electrode or on both the negative and positive electrodes. When activated carbon, for example, is used as the positive electrode active material, the doping amount of lithium ions in the positive electrode increases, and the potential of the positive electrode becomes low. In this case, the lithium ions are consumed irreversibly, and this causes a problem such as a reduction in the capacity of the capacitor. Therefore, preferably, the negative and positive electrodes are doped with lithium ions in consideration of the active materials used, in order to prevent the occurrence of the above problem. If the step of controlling the doping amounts of lithium ions in the positive and negative electrodes is complicated, only the negative electrode is doped with lithium ions.

In the present invention, the capacitance and capacity are defined as follows. The capacitance of the capacitor is the quantity of electricity per unit voltage flowing through the capacitor (the gradient of a discharge curve), and the unit of the capacitance is F (farad). The capacitance per unit mass of the capacitor is a value obtained by dividing the capacitance of the capacitor by the total mass of the positive electrode active material and the negative electrode active material, and the unit of the capacitance per unit mass is F/g. The capacitance of the positive electrode or negative electrode is the quantity of electricity per unit voltage flowing through the positive electrode or negative electrode (the gradient of a discharge curve), and the unit of the capacitance is F. The capacitance per unit mass of the positive electrode active material or the negative electrode active material is a value obtained by dividing the capacitance of the positive electrode or the negative electrode by the mass of the positive electrode active material or the negative electrode active material, and the unit of the capacitance per unit mass is F/g.

The capacity of the capacitor is the product of the capacitance of the capacitor and the difference between the discharge start voltage and discharge end voltage of the capacitor, i.e., a change in voltage, and the unit of the capacity is C (coulomb). 1 C is the amount of charge when a current of 1 A flows for 1 second. Therefore, in the present invention, the capacity is converted and represented by mAh. The capacity of the positive electrode is the product of the capacitance of the positive electrode and the difference between the potential of the positive electrode at the start of discharge and the potential of the positive electrode at the end of discharge (a change in potential of the positive electrode), and the unit of the capacity is C or mAh. The capacity of the negative electrode is the product of the capacitance of the negative electrode and the difference between the potential of the negative electrode at the start of discharge and the potential of the negative electrode at the end of discharge (a change in potential of the negative electrode), and the unit of the capacity is C or mAh. The capacity of the capacitor agrees with the capacity of the positive electrode and the capacity of the negative electrode.

Here, the discharge start voltage means the voltage 100 msec after the start of the flow of a current. Therefore, a voltage drop upon discharging is the difference between the charging voltage of the capacitor (the voltage immediately before the start of the flow of discharge current) and the discharge start voltage. When the current is small (a load is small), the voltage drop becomes small. When the current is large (the load is high), the voltage drop becomes large. The discharge curve is not strictly a straight line. However, in the present invention, a value computed using a straight line connecting the discharge start voltage to the discharge end voltage is used as the capacitance of the capacitor. The capacity retention rate in a high-load charging-discharging cycle is defined as follows. An initial discharge capacity is measured at a current value of about 1° C. Then a charging-discharging cycle is repeated at a high-load current of 10 C or higher. For every 2,000 cycles, the discharge capacity is measured at a current value of 10 C as is the initial capacity, and the capacity retention rate is defined as the ratio of the measured capacity to the initial discharge capacity. The current value of 10 C is a current value at which the capacity of the capacitor is reached in $1/10$ hours. For example, at a current value of 100 C, the capacity of the capacitor is reached in $1/100$ hours.

<Outer Container>

Any of various containers generally used for batteries and capacitors, such as can-shaped containers made of a metal such as iron or aluminum and film-shaped containers using a laminated film produced by laminating a nylon layer, an aluminum layer, and a polypropylene layer, can be used as the outer container. No particular limitation is imposed on the shape of the outer container, and a cylindrical or rectangular outer container may be appropriately selected according to the form of the electrode unit and the application of the capacitor.

In the lithium ion capacitor of the present invention, the ratios of the deviations of the thicknesses of the electrode layers formed on the front and back surfaces of the current collector in the negative electrode from the average of the thicknesses of these electrode layers to the average are within a specific range. Therefore, even after high-load charging-discharging is repeated many times, a high capacity retention rate can be achieved, and an increase in internal resistance is suppressed. In addition, the occurrence of a short circuit due to precipitation of lithium on the negative electrode is prevented, and therefore long service life is achieved.

The reason that the above effects are obtained may be because of the following. When high-load charging-discharging is repeated many times on the lithium ion capacitor, charging and discharging reactions occur repeatedly. Particularly during charging, the reaction of doping the electrode layers in the negative electrode with lithium ions is a rate controlling reaction. During charging, it is necessary that the lithium ions diffuse into the electrode layers in the negative electrodes uniformly at high rate. For example, when the thickness of the one electrode layer in the negative electrode is the same as the thickness of the other electrode layer, the doping amounts of lithium ions in the one and the other electrode layers are equal to each other, and the potentials of the one and the other electrode layers are thereby equal to each other. Therefore, even after high-load charging-discharging is repeatedly performed, a high capacity retention rate can be achieved, and an increase in internal resistance can be suppressed. In addition, since the doping amounts of lithium ions in the one and the other electrode layers are equal to each other, precipitation of metallic lithium can be suppressed.

EXAMPLES

The present invention will next be specifically described by way of Example. However, the present invention is not limited to these Examples.

Example 1

1. Production of Positive Electrode 1-1. Preparation of Conductive Coating

Ion exchanged water was added to and mixed with 95 parts by mass of carbon powder (average particle diameter: 4.5 μm) and 5 parts by mass of carboxymethyl cellulose to prepare a conductive coating. The obtained conductive coating is referred to as a "conductive coating (1)."

1-2. Preparation of Positive Electrode Slurry

Ion exchanged water was added to and mixed with 87 parts by mass of activated carbon (phenol-based activated carbon having a specific surface area of 2,030 m$^2$/g and an average particle diameter D50 of 4 μm), 4 parts by mass of acetylene black powder, 6 parts by mass of an SBR-based binder ("TRD2001," manufactured by JSR), and 3 parts by mass of carboxymethyl cellulose to prepare a positive electrode slurry. The obtained positive electrode slurry is referred to as a "positive electrode slurry (1)."

1-3. Formation of Electrode Layers

A positive electrode current collector having a structure in which a plurality of circular through holes having an opening area of 0.79 mm$^2$ were arranged in a staggered manner in a band-shaped aluminum foil having a width of 200 mm and a thickness of 15 μm was produced by a punching method, with the aperture ratio of the current collector being 42%. Part of opposite surfaces of the positive electrode current collector was coated with the conductive coating (1) using a vertical die-type double sided coater under the coating conditions of a coating width of 130 mm and a coating rate of 8 m/min. In this case, the target value of the total thickness of the coatings on the front and back surfaces of the positive electrode current collector was set to 20 μm. Then the coatings were dried under reduced pressure at 200° C. for 24 hours to form conductive layers on the opposite surfaces of the positive electrode current collector. Then the surfaces of the conductive layers formed on the opposite surfaces of the positive electrode current collector were coated with the positive electrode slurry (1) using a vertical die-type double sided coater under the coating condition of a coating rate of 8 m/min. In this case, the target value of the total thickness of the coatings on the front and back sides of the positive electrode current collector was set to 150 μm. Then the coatings were dried under reduced pressure at 200° C. for 24 hours to form electrode layers on the conductive layers formed on the front and back surfaces of the positive electrode current collector.

In the above process, to coat the opposite surfaces with the positive electrode slurry, the positive electrode current collector having the conductive layers formed thereon was caused to pass between two slit dies, and the opposite surfaces of the positive electrode current collector were thereby coated with the positive electrode slurry. By adjusting the gaps between the positive electrode current collector and the slit dies, the thicknesses of the coatings on the front and back surfaces of the positive electrode current collector were controlled.

Then the positive electrode current collector having the conductive layers and electrode layers stacked on the front and back surfaces thereof was cut into a plane size of 98×143 mm such that the plane size of a portion having the conductive layers and electrode layers formed thereon was 98×128 mm and the plane size of a portion having no layers formed thereon was 98×15 mm to thereby produce a positive electrode. This positive electrode is referred to as a "positive electrode (1)."

The thicknesses of the electrode layers in the obtained positive electrode were measured. The thickness of the electrode layer on the front side was 77.2 μm, and the thickness of the electrode layer on the back side was 72.8 μm. The ratios of the deviations of the thicknesses of the two electrode layers from their average thickness to the average thickness were 3% and −3%.

The mass of the positive electrode active material in the positive electrode (1) was 0.82 g.

2. Production of Negative Electrode 2-1. Preparation of Negative Electrode Slurry Ion exchanged water was added to and mixed with 87 parts by mass of carbon powder (non-graphitizable carbon having a specific surface area of 16 m$^2$/g and an average particle diameter D50 of 4 μm), 4 parts by mass of acetylene black powder, 6 parts by mass of an SBR-based binder ("TRD2001," manufactured by JSR), and 3 parts by mass of carboxymethyl cellulose to prepare a negative electrode slurry. The obtained negative electrode slurry is referred to as a "negative electrode slurry (1)."

2-2. Formation of Electrode Layers

A negative electrode current collector having a structure in which a plurality of circular through holes having an opening area of 0.79 mm$^2$ were arranged in a staggered manner in a band-shaped copper foil having a width of 200 mm and a thickness of 25 μm was produced by a punching method, with the aperture ratio of the current collector being 42%.

Part of opposite surfaces of the negative electrode current collector was coated with the negative electrode slurry (1) using a vertical die-type double sided coater under the coating condition of a coating rate of 8 m/min. In this case, the target value of the total thickness of the coatings on the front and back surfaces of the negative electrode current collector was set to 60 μm. Then the coatings were dried under reduced pressure at 200° C. for 24 hours to form electrode layers on the front and back surfaces of the negative electrode current collector.

In the above process, to coat the opposite surfaces with the negative electrode slurry, the negative electrode current collector was caused to pass between two slit dies, and the opposite surfaces of the negative electrode current collector were thereby coated with the negative electrode slurry. By adjusting the gaps between the negative electrode current collector and the slit dies, the thicknesses of the coatings on the front and back surfaces of the negative electrode current collector were controlled.

Separately, the negative electrode slurry was applied to a region with a length of 500 m under the same conditions as those in the above-described application of the negative electrode slurry. The thickness of the obtained coating was measured at a total of 6 points spaced apart by 100 m in a coating direction using a film thickness meter, and the deviations of the thickness at the measurement points were found to be substantially 0.

The negative electrode current collector having the electrode layers formed on the front and back surfaces thereof was cut into a plane size of 100×145 mm such that the plane size of a portion having the electrode layers formed thereon was 100×130 mm and the plane size of a portion having no electrode layers formed thereon was 100×15 mm to thereby produce a negative electrode. This negative electrode is referred to as a "negative electrode (1)."

The thicknesses of the electrode layers in the obtained negative electrode were measured. The thickness of the electrode layer on the front side was 30.9 μm, and the thickness of the electrode layer on the back side was 29.1 μm. The ratios of the deviations of the thicknesses of the two electrode layers from their average thickness to the average thickness were 3% and −3%.

The mass of the negative electrode active material in the negative electrode (1) was 0.65 g.

3. Production of Lithium Ion Capacitor

First, 22 separators with a thickness of 50 μm, 10 positive electrodes (1), and 11 negative electrodes (1) were prepared. These were stacked in the order of a separator, a negative electrode (1), a separator, a positive electrode (1), and so on such that the electrode layers in the positive electrodes (1) overlapped the electrode layers in the negative electrodes (1) and that the exposed portions of the positive electrode current collectors and the exposed portions of the negative electrode current collectors were placed on opposite sides and did not overlap each other. Tapes were bonded to the four edges of the obtained stack that extended in the stacking direction to hold the stack, and a stacked-type electrode unit was thereby produced. In the above process, all the positive electrodes (1) and all the negative electrodes (1) were stacked with the front surfaces of their current collectors facing in the same direction so that the difference in thickness between the electrode layer formed on the front surface of the current collector in each positive electrode (1) and the electrode layer formed on the back surface and the difference in thickness between the electrode layer formed on the front surface of the current collector in each negative electrode (1) and the electrode layer formed on the back surface did not cause differences in the separation distances between the current collectors in the positive electrodes (1) and the current collectors in the adjacent negative electrodes (1).

Then a lithium foil having a thickness of 260 μm was prepared and cut so that the capacity per unit mass of the negative electrode active material in the negative electrodes (1) making up the electrode unit became 550 mAh/g. The cut lithium foil was compression-bonded to a copper net having a thickness of 40 μm and placed on the upper surface of the electrode unit.

Then an aluminum-made positive electrode terminal having a width of 50 mm, a length of 50 mm, and a thickness of 0.2 mm and including a sealant film thermally fused to a sealing portion in advance was placed on the exposed portions of the positive electrode current collectors in the positive electrodes (1) in the produced electrode unit and then secured to the exposed portions by ultrasonic welding. An aluminum-made negative electrode terminal having a width of 50 mm, a length of 50 mm, and a thickness of 0.2 mm and including a sealant film thermally fused to a sealing portion in advance was placed on the exposed portions of the negative electrode current collectors in the negative electrodes (1) in the electrode unit and then secured to the exposed portions by ultrasonic welding. Then the electrode unit including the positive electrode terminal and negative electrode terminal secured thereto was disposed between two laminated films each produced by laminating a nylon layer, an aluminum layer, and a polypropylene layer. The positive electrode terminal and the negative electrode terminal were disposed protruding from one edge of each laminated film and the other edge opposite thereto, and three edges of one of the laminated films including the one edge and the other edge were thermally fused to three edges of the other laminated film. Then 50 g of an electrolyte solution prepared by dissolving $LiPF_6$ in a propylene carbonate solvent at a concentration of 1 mol/L and used as an organic electrolyte was introduced to impregnate the electrode unit with the electrolyte solution under reduced pressure. Then non-fused edges of the laminated films were thermally fused to each other under reduced pressure.

A total of five lithium ion capacitors were produced in the manner described above. After 10 days, one of these lithium ion capacitors was disassembled to check the presence or absence of the lithium foil. It was found that the lithium foil completely disappeared.

In these lithium ion capacitors, the capacitance per unit mass of the negative electrode active material in the negative electrodes (1) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (1) was 7.2 g. The potential of the positive electrodes after the positive electrodes were short-circuited with the negative electrodes was 0.9 V.

Example 2

A total of five lithium ion capacitors were produced as in Example 1 except that, when the electrode layers in each negative electrode were formed, the gaps between the negative electrode current collector and the slit dies used to apply the negative electrode slurry were changed. The obtained negative electrode is referred to as a "negative electrode (2)."

In the above lithium ion capacitors, the thicknesses of the electrode layers in the negative electrodes (2) were measured. The thickness of each electrode layer on the front side was 28.5 μm, and the thickness of each electrode layer on the back side was 31.5 μm. The ratios of the deviations of the thicknesses of the two electrode layers from their average thickness to the average thickness were 5% and −5%. After 10 days, one of the five lithium ion capacitors was disassembled to check the presence or absence of the lithium foil. It was found that the lithium foil completely disappeared.

In these lithium ion capacitors, the capacitance per unit mass of the negative electrode active material in the negative electrodes (2) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (2) was 7.2 g. The potential of the positive electrodes after the positive electrodes were short-circuited with the negative electrodes was 0.95 V.

Example 3

A total of five lithium ion capacitors were produced as in Example 1 except that, when the electrode layers in each negative electrode were formed, the gaps between the negative electrode current collector and the slit dies used to apply the negative electrode slurry were changed. The obtained negative electrode is referred to as a "negative electrode (3)."

In the above lithium ion capacitors, the thicknesses of the electrode layers in the negative electrodes (3) were measured. The thickness of each electrode layer on the front side was 33.0 μm, and the thickness of each electrode layer on the back side was 27.0 μm. The ratios of the deviations of the thicknesses of the two electrode layers from their average thickness to the average thickness were 10% and −10%.

After 10 days, one of the five lithium ion capacitors was disassembled to check the presence or absence of the lithium foil. It was found that the lithium foil completely disappeared.

In these lithium ion capacitors, the capacitance per unit mass of the negative electrode active material in the negative electrodes (3) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (3) was 7.2 g. The potential of the positive electrodes after the positive electrodes were short-circuited with the negative electrodes was 0.95 V.

Comparative Example 1

A total of five lithium ion capacitors were produced as in Example 1 except that, when the electrode layers in each negative electrode were formed, the gaps between the negative electrode current collector and the slit dies used to apply the negative electrode slurry were changed. The obtained negative electrode is referred to as a "negative electrode (4)."

In the above lithium ion capacitors, the thicknesses of the electrode layers in the negative electrodes (4) were measured. The thickness of each electrode layer on the front side was 34.5 μm, and the thickness of each electrode layer on the back side was 25.5 μm. The ratios of the deviations of the thicknesses of the two electrode layers from their average thickness to the average thickness were 15% and −15%.

After 10 days, one of the five lithium ion capacitors was disassembled to check the presence or absence of the lithium foil. It was found that the lithium foil completely disappeared.

In these lithium ion capacitors, the capacitance per unit mass of the negative electrode active material in the negative electrodes (4) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (4) was 7.2 g. The potential of the positive electrodes after the positive electrodes were short-circuited with the negative electrodes was 0.9 V.

Comparative Example 2

A total of five lithium ion capacitors were produced as in Example 1 except that, when the electrode layers in each negative electrode were formed, the gaps between the negative electrode current collector and the slit dies used to apply the negative electrode slurry were changed. The obtained negative electrode is referred to as a "negative electrode (5)."

In the above lithium ion capacitors, the thicknesses of the electrode layers in the negative electrodes (5) were measured. The thickness of each electrode layer on the front side was 37.5 and the thickness of each electrode layer on the back side was 22.5 μm. The ratios of the deviations of the thicknesses of the two electrode layers from their average thickness to the average thickness were 25% and −25%.

After 10 days, one of the five lithium ion capacitors was disassembled to check the presence or absence of the lithium foil. It was found that the lithium foil completely disappeared.

In these lithium ion capacitors, the capacitance per unit mass of the negative electrode active material in the negative electrodes (5) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (5) was 7.2 g. The potential of the positive electrodes after the positive electrodes were short-circuited with the negative electrodes was 0.9 V.

Comparative Example 3

A total of five lithium ion capacitors were produced as in Example 1 except that, when the electrode layers in each negative electrode were formed, the gaps between the negative electrode current collector and the slit dies used to apply the negative electrode slurry were changed. The obtained negative electrode is referred to as a "negative electrode (6)."

In the above lithium ion capacitors, the thicknesses of the electrode layers in the negative electrodes (6) were measured. The thickness of each electrode layer on the front side was 40.5 μm, and the thickness of each electrode layer on the back side was 19.5 μm. The ratios of the deviations of the thicknesses of the two electrode layers from their average thickness to the average thickness were 35% and −35%.

After 10 days, one of the five lithium ion capacitors was disassembled to check the presence or absence of the lithium foil. It was found that the lithium foil completely disappeared.

In these lithium ion capacitors, the capacitance per unit mass of the negative electrode active material in the negative electrodes (6) was 3,600 F/g, and the capacitance per unit mass of the positive electrode active material in the positive electrodes (1) was 132 F/g. The total mass of the positive electrode active material in all the positive electrodes (1) was 8.2 g, and the total mass of the negative electrode active material in all the negative electrodes (6) was 7.2 g. The potential of the positive electrodes after the positive electrodes were short-circuited with the negative electrodes was 0.9 V.

[Initial Characteristics Test]

For each of four lithium ion capacitors in each of Examples 1 to 3 and Comparative Examples 1 to 3, constant current-constant voltage charging was performed for 1 hour. More specifically, the lithium ion capacitor was charged at a constant current of 5 A until the voltage reached 3.8 V, and then a constant voltage of 3.8 V was applied. Next, discharging was performed at a constant current of 5 A until the voltage reached 2.2 V. This 3.8 V-2.2 V charging-discharging operation was repeated. After the third discharging, the capacity of the capacitor, its internal resistance value computed using a voltage drop 0.1 seconds after the start of discharging, and the energy density of the capacitor were measured. These results are shown in TABLE 1 as the mean values for four lithium ion capacitors.

TABLE 1

|  | CAPACITY (mAh) | INTERNAL RESISTANCE (m Ω) | ENERGY DENSITY (Wh/L) |
|---|---|---|---|
| EXAMPLE 1 | 467 | 4.2 | 21.5 |
| EXAMPLE 2 | 462 | 4.2 | 21.5 |

TABLE 1-continued

|  | CAPACITY (mAh) | INTERNAL RESISTANCE (m Ω) | ENERGY DENSITY (Wh/L) |
|---|---|---|---|
| EXAMPLE 3 | 465 | 4.2 | 21.5 |
| COMPARATIVE EXAMPLE 1 | 463 | 4.2 | 21.5 |
| COMPARATIVE EXAMPLE 2 | 465 | 4.2 | 21.5 |
| COMPARATIVE EXAMPLE 3 | 461 | 4.2 | 21.5 |

[High-Load Charging-Discharging Cycle Test]

For each of two lithium ion capacitors in each of Examples 1 to 3 and Comparative Examples 1 to 3, a constant current charging-discharging cycle test at 50 A (about 100 C) was performed at an environment temperature of 25° C. For every 5,000 cycles, the capacity of the capacitor after discharging and its internal resistance value computed using a voltage drop 0.1 seconds after the start of discharging were measured, and the ratios (%) of the measured values to the initial characteristic values were determined.

50,000 cycles of a high-load charging-discharging cycle test were performed on one of the two lithium ion capacitors, and 100,000 cycles of the test were performed on the other lithium ion capacitor. After the cycle test, each of the lithium ion capacitors was disassembled, and the presence or absence of precipitation of lithium was checked.

The results for the capacitance of the capacitors are shown in TABLE 2, and the results for the internal resistance value are shown in TABLE 3. The results for the presence or absence of precipitation of lithium are shown in TABLE 4.

TABLE 4

|  | OCCURRENCE OF PRECIPITATION OF LITHIUM | |
|---|---|---|
|  | AFTER 50,000 CYCLES | AFTER 100,000 CYCLES |
| EXAMPLE 1 | NONE | NONE |
| EXAMPLE 2 | NONE | NONE |
| EXAMPLE 3 | NONE | NONE |
| COMPARATIVE EXAMPLE 1 | NONE | NONE |
| COMPARATIVE EXAMPLE 2 | NONE | NONE |
| COMPARATIVE EXAMPLE 3 | NONE | NONE |

[Low-Temperature High-Load Charging-Discharging Cycle Test]

For each of two lithium ion capacitors in each of Examples 1 to 3 and Comparative Examples 1 to 3, a constant current charging-discharging cycle test at 50 A (about 100 C) was performed at an environment temperature of −10° C. For every 5,000 cycles, the capacity of the capacitor after discharging and its internal resistance value computed using a voltage drop 0.1 seconds after the start of discharging were measured, and the ratios of the measured values to the initial characteristic values were determined.

50,000 cycles of a high-load charging-discharging cycle test were performed on one of the two lithium ion capacitors, and 100,000 cycles of the test were performed on the other lithium ion capacitor. After the cycle test, each of the lithium ion capacitors was disassembled, and the presence or absence of precipitation of lithium was checked.

TABLE 2

|  | 1 CYCLE | 10000 CYCLES | 20000 CYCLES | 30000 CYCLES | 40000 CYCLES | 50000 CYCLES | 75000 CYCLES | 100000 CYCLES |
|---|---|---|---|---|---|---|---|---|
| EXAMPLE 1 | 100% | 99.90% | 99.80% | 99.60% | 99.50% | 99.10% | 98.30% | 97.20% |
| EXAMPLE 2 | 100% | 99.10% | 98.20% | 97.50% | 97.10% | 96.50% | 95.70% | 95.00% |
| EXAMPLE 3 | 100% | 98.20% | 97.10% | 96.20% | 95.00% | 93.50% | 92.40% | 92.10% |
| COMPARATIVE EXAMPLE 1 | 100% | 96.90% | 95.50% | 94.00% | 91.90% | 89.30% | 84.40% | 79.40% |
| COMPARATIVE EXAMPLE 2 | 100% | 92.00% | 87.30% | 84.20% | 79.50% | 75.40% | 69.60% | 64.30% |
| COMPARATIVE EXAMPLE 3 | 100% | 89.30% | 80.10% | 73.00% | 68.20% | 64.30% | 58.70% | 54.90% |

TABLE 3

|  | 1 CYCLE | 10000 CYCLES | 20000 CYCLES | 30000 CYCLES | 40000 CYCLES | 50000 CYCLES | 75000 CYCLES | 100000 CYCLES |
|---|---|---|---|---|---|---|---|---|
| EXAMPLE 1 | 100% | 100.40% | 100.70% | 101.10% | 101.60% | 102.00% | 102.90% | 103.80% |
| EXAMPLE 2 | 100% | 100.50% | 101.00% | 101.40% | 101.90% | 102.50% | 103.90% | 105.60% |
| EXAMPLE 3 | 100% | 100.80% | 101.70% | 102.50% | 103.30% | 104.20% | 106.10% | 108.50% |
| COMPARATIVE EXAMPLE 1 | 100% | 102.60% | 105.10% | 107.30% | 109.50% | 112.00% | 118.70% | 125.10% |
| COMPARATIVE EXAMPLE 2 | 100% | 103.30% | 106.80% | 109.70% | 112.60% | 116.80% | 124.90% | 133.30% |
| COMPARATIVE EXAMPLE 3 | 100% | 104.80% | 109.00% | 114.20% | 118.10% | 122.50% | 134.00% | 145.60% |

The results for the capacitance of the capacitors are shown in TABLE 5, and the results for the internal resistance value are shown in TABLE 6. The results for the presence or absence of precipitation of lithium are shown in TABLE 7.

TABLE 5

|  | 1 CYCLE | 10000 CYCLES | 20000 CYCLES | 30000 CYCLES | 40000 CYCLES | 50000 CYCLES | 75000 CYCLES | 100000 CYCLES |
|---|---|---|---|---|---|---|---|---|
| EXAMPLE 1 | 100% | 99.80% | 99.70% | 99.60% | 99.50% | 98.90% | 98.20% | 97.00% |
| EXAMPLE 2 | 100% | 99.00% | 98.00% | 97.50% | 97.20% | 96.20% | 95.30% | 94.40% |
| EXAMPLE 3 | 100% | 98.00% | 96.90% | 95.90% | 95.00% | 93.20% | 92.20% | 91.40% |
| COMPARATIVE EXAMPLE 1 | 100% | 90.10% | 88.30% | 86.20% | 83.90% | 79.90% | 76.10% | 72.30% |
| COMPARATIVE EXAMPLE 2 | 100% | 87.00% | 80.80% | 78.20% | 72.50% | 66.30% | 62.70% | 58.10% |
| COMPARATIVE EXAMPLE 3 | 100% | 83.20% | 74.40% | 65.90% | 61.70% | 56.10% | 53.30% | 49.40% |

TABLE 6

|  | 1 CYCLE | 10000 CYCLES | 20000 CYCLES | 30000 CYCLES | 40000 CYCLES | 50000 CYCLES | 75000 CYCLES | 100000 CYCLES |
|---|---|---|---|---|---|---|---|---|
| EXAMPLE 1 | 100% | 100.50% | 100.80% | 101.00% | 101.90% | 102.20% | 103.10% | 104.20% |
| EXAMPLE 2 | 100% | 100.70% | 101.10% | 101.30% | 102.00% | 103.00% | 106.00% | 109.30% |
| EXAMPLE 3 | 100% | 100.60% | 101.80% | 102.70% | 103.10% | 104.50% | 112.40% | 120.30% |
| COMPARATIVE EXAMPLE 1 | 100% | 104.70% | 108.60% | 112.30% | 116.30% | 122.00% | 132.70% | 145.20% |
| COMPARATIVE EXAMPLE 2 | 100% | 105.30% | 108.80% | 114.70% | 120.60% | 127.80% | 141.90% | 154.60% |
| COMPARATIVE EXAMPLE 3 | 100% | 107.90% | 116.10% | 123.60% | 130.20% | 137.30% | 155.00% | 176.40% |

TABLE 7

| | OCCURRENCE OF PRECIPITATION OF LITHIUM | |
|---|---|---|
| | AFTER 50,000 CYCLES | AFTER 100,000 CYCLES |
| EXAMPLE 1 | NONE | NONE |
| EXAMPLE 2 | NONE | NONE |
| EXAMPLE 3 | NONE | NONE |
| COMPARATIVE EXAMPLE 1 | NONE | PRECIPITATION OCCURRED IN CIRCUMFERENTIAL PORTIONS OF ELECTRODE LAYERS |
| COMPARATIVE EXAMPLE 2 | PRECIPITATION OCCURRED IN CIRCUMFERENTIAL PORTIONS OF ELECTRODE LAYERS | PRECIPITATION OCCURRED OVER ENTIRE ELECTRODE LAYERS |
| COMPARATIVE EXAMPLE 3 | PRECIPITATION OCCURRED OVER ENTIRE ELECTRODE LAYERS | PRECIPITATION OCCURRED OVER ENTIRE ELECTRODE LAYERS |

As can be seen from the above results, in the lithium ion capacitors in Examples 1 to 3, a high capacity retention rate was obtained after high-load charging-discharging was repeated many times in both the normal temperature environment and the low temperature environment, and an increase in internal resistance was also suppressed. In addition, the occurrence of a short circuit due to precipitation of lithium on the negative electrode was prevented, and therefore long service life was found to be achieved.

The invention claimed is:
1. A lithium ion capacitor, comprising:
a positive electrode;
a negative electrode; and
an electrolyte solution, wherein:
the negative electrode is doped with lithium ions;
the negative electrode comprises a negative electrode current collector and electrode layers comprising a negative electrode active material and formed on front and back surfaces of the negative electrode current collector;
in the negative electrode, a thickness T1 of an electrode layer formed on the front surface of the current collector is different than a thickness T2 of an electrode layer formed on the back surface of the current collector;
in the negative electrode, an average thickness T0 of the thickness T1 and the thickness T2 is expressed as:

$$T0=(T1+T2)/2;$$

in the negative electrode, a deviation D1 of the thickness T1 is expressed as:

$$D1=T1-T0;$$

in the negative electrode, a deviation D2 of the thickness T2 is expressed as:

$$D2=T2-T0;$$

in the negative electrode, a ratio r1 of the deviation D1 to the average thickness T0 is expressed as:

$$r1=(D1/T0)\times100(\%);$$

in the negative electrode, a ratio r2 of the deviation D2 to the average thickness T0 is expressed as:

$$r2=(D2/T0)\times100(\%); \text{ and}$$

in the negative electrode, the ratio r1 and the ratio r2 satisfy the following expressions:

$$0<|r1|=|r2|\leq 10(\%)$$

$$r1+r2=0$$

2. The lithium ion capacitor according to claim 1, wherein:
a thickness of the negative electrode current collector in the negative electrode is 5 to 40 µm; and
a sum of the thicknesses of the electrode layers in the negative electrode is 20 to 200 µm.

3. The lithium ion capacitor according to claim 1 or 2, wherein:
the positive electrode comprises a positive electrode current collector and electrode layers comprising a positive electrode active material and formed on front and back surfaces of the positive electrode current collector;
a capacitance per unit mass of the negative electrode active material in the negative electrode is at least three times a capacitance per unit mass of the positive electrode active material in the positive electrode; and
a mass of the positive electrode active material in the positive electrode is larger than a mass of the negative electrode active material in the negative electrode.

4. The lithium ion capacitor according to claim 1 or 2, wherein the negative electrode active material contained in the electrode layer formed on the front surface of the negative electrode current collector in the negative electrode is identical to the negative electrode active material contained in the electrode layer formed on the back surface of the negative electrode current collector.

5. The lithium ion capacitor according to claim 1 or 2, wherein the negative electrode active material in the negative electrode is graphite or non-graphitizable carbon.

6. The lithium ion capacitor according to claim 1, wherein the electrode layers comprising the negative electrode active material are doped with the lithium ions.

7. The lithium ion capacitor according to claim 1, wherein the negative electrode current collector is formed of a porous material having pores passing through the front and back surfaces thereof.

8. The lithium ion capacitor according to claim 1, wherein the positive electrode comprising a positive electrode current collector and electrode layers, and the positive electrode current collector is formed of a porous material having pores passing through the front and back surfaces thereof.

9. The lithium ion capacitor according to claim 3, wherein the negative electrode active material contained in the electrode layer formed on the front surface of the negative electrode current collector in the negative electrode is identical to the negative electrode active material contained in the electrode layer formed on the back surface of the negative electrode current collector.

10. The lithium ion capacitor according to claim 3, wherein the negative electrode active material in the negative electrode is graphite or non-graphitizable carbon.

11. The lithium ion capacitor according to claim 4, wherein the negative electrode active material in the negative electrode is graphite or non-graphitizable carbon.

* * * * *